April 18, 1933. H. KRIEGSHEIM 1,904,900
CONTROL OF THE SALINE CONTENT OF BOILER WATERS
Original Filed March 8, 1927
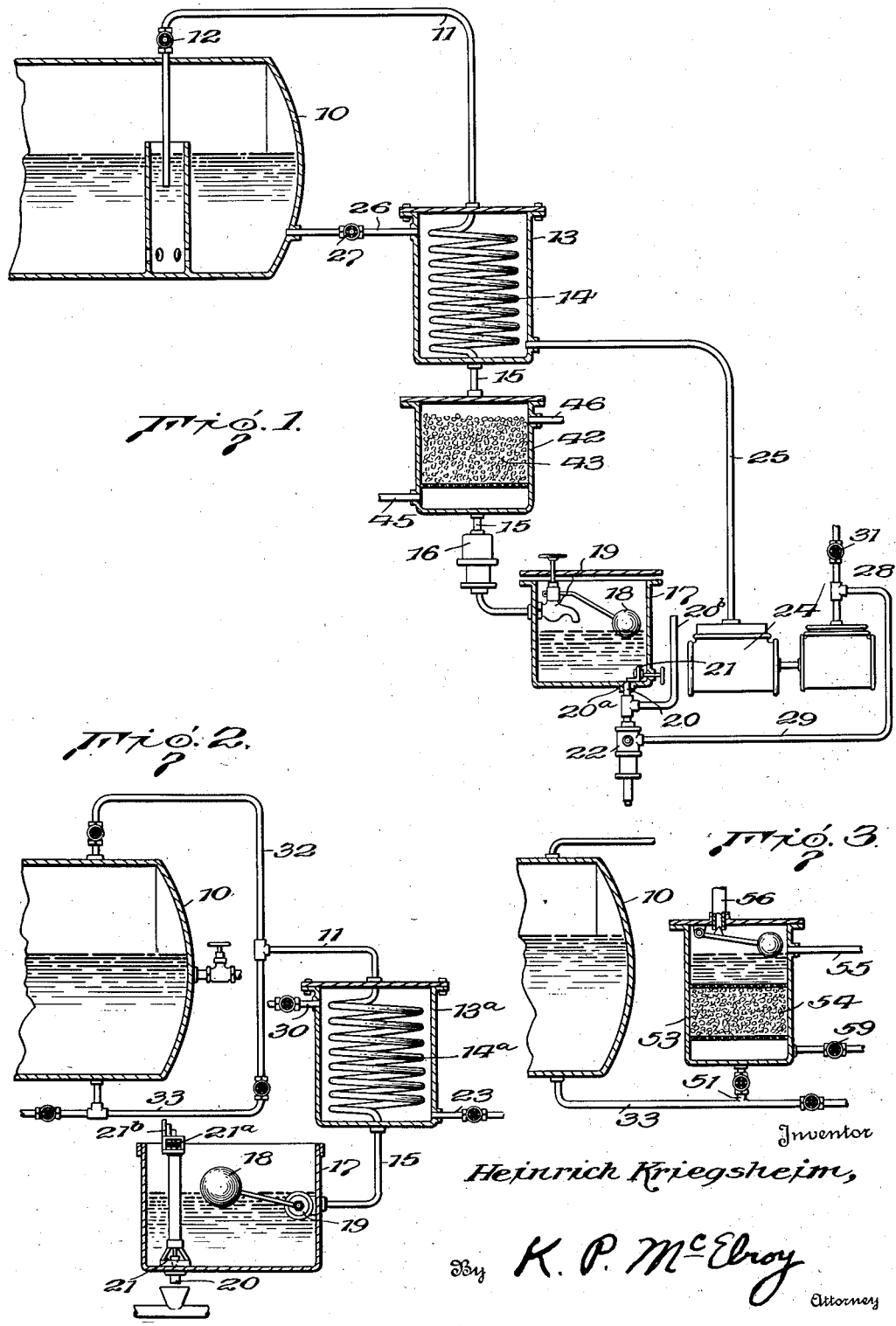

Patented Apr. 18, 1933

1,904,900

UNITED STATES PATENT OFFICE

HEINRICH KRIEGSHEIM, OF NEW YORK, N. Y., ASSIGNOR TO THE PERMUTIT COMPANY, OF NEW YORK, N. Y., A CORPORATION OF DELAWARE

CONTROL OF THE SALINE CONTENT OF BOILER WATERS

Continuation of application Serial No. 173,781, filed March 8, 1927. This application filed November 11, 1931. Serial No. 574,442.

This invention relates to control of the saline content of boiler waters; and it comprises a method of maintaining a concentration of dissolved salines below a desired maximum in operating steam boilers wherein the boiler salines are discharged from the boiler under pressure at substantially constant rates irrespective of pressure variation within the boiler and over extended periods of time, without coordination of the rate of discharge with varying rates of feeding water to the boiler in the course of such periods, the discharged boiler salines being normally cooled, advantageously by transfer of heat to the feed water, and the pressure being then reduced to atmospheric, the discharge of salines being controlled by adjusting their flow after the release of pressure at fixed rates directly proportioned to observed variation in the concentration of the boiler salines discharged; and it further comprises a new assemblage of apparatus elements useful in applying the described method, said assemblage comprising a boiler, a water discharge line therefrom usually including a heat interchanger, a control tank open to the atmosphere and receiving the salines from the discharge line, a valve in the discharge line, a float in the control tank controlling the discharge valve and an adjustable outlet for the control tank adapted with the float control of the valve to maintain substantially constant an adjusted rate of discharge by the discharge line; all as more fully hereinafter set forth and as claimed.

In the modern steam power station usually the greater part of the water evaporated to steam in the boiler is condensed for return thereto. The condensate returned may constitute as much as 95 per cent of the feed water put into the boiler, the loss of steam due to leakage etc. in passing from the boilers through the engines to the condensers amounting to perhaps 5 per cent. This loss is made up by water from an outside source. The "make-up" water may be raw water or softened water or distilled water produced in a separate evaporator.

It has been assumed that by distilling the make-up water, the problem of avoiding undesirable concentrations of salts in the boiler water and the formation of scale in the boilers would be solved. However, the unavoidable condenser leakage in condensing exhaust steam and the fact that even distilled water as commercially produced on a large scale is never entirely free of dissolved salts, prevents the accomplishment of the desired result. There is always some saline matter in the boiler feed water. The water leaking into the condenser as well as the make-up water, irrespective of its source, always contains a certain amount of mineral matter or salts in solution. In plants operating without the use of condensers, or where steam is used for various purposes other than for power and in those where only a part of the produced steam can be returned as condensate, the proportion of make-up water is, of course, increased, and, in fact, may reach 100 per cent of the total steam production and thus of the feed water. As the amount of salts introduced into the boiler by the feed water during a day is usually substantially constant for any particular installation, the quantity of solids added to the boiler water during any given period, say, within a day of 24 hours, or within an operating shift for example, is fixed and ascertainable. Some salines in the boiler feed are usually desirable. In another and prior Patent, No. 1,235,815, I have described the advantage of maintaining certain concentrations of salines in the boiler and in accessories where hot water is in contact with iron.

The steam evaporated from the boiler water leaves in the boiler the solids originally contained in the feed water and as a result the concentration of salines in the boiler increases during operation. For any given installation, there is a maximum permissible concentration of salines in the boiler water, which can be readily ascertained. The high rate of evaporation obtained in boilers of the modern type, wherein the entire liquid contents may be replaced within a short time, introduces new difficulties in the control of the saline content. The rapidity of the concentrating action within the boiler necessitates a correspondingly high rate of blow-off and renders close control of the saline concentration difficult. The usual high pressures developed also make the blowing off operation more difficult and somewhat dangerous.

It is apparent that provision of a control system by means of which a concentration of boiler salines less than the permissible maximum can be obtained and maintained is highly desirable. Various attempts have been made to control the accumulation of salines in the boiler. It has been common practice to "blow down" the boiler at intervals to remove a large proportion of the boiler salines and then to permit the concentrating action to repeat itself until a portion of the boiler contents is manually discharged. This method of operation is manifestly crude and unsatisfactory, and attempts have been made to blow off the boiler salines with automatic control coordinating the rate of removal of salines in the blow-off water with the rate of feeding water to the boiler. While such coordination is an improvement over the crude method of manual control, it involves expensive equipment as well as high cost of maintenance; it is also complicated and for all these reasons not very desirable for practical purposes. What is required is to hold the concentration of salines in the boiler water down below the point at which foaming, priming and other troubles begin.

In the present invention I accomplish this object economically by a method and means comparatively simple. I discharge the boiler salines under pressure from the boiler continuously and at substantially constant rates over relatively long operating periods without attempting to coordinate the momentary rate of discharge with temporary variations in the rate of feeding water to the boiler. So doing, I set the discharge for an operating period at a fixed rate calculated to remove from the boiler the salines introduced in the feed water during that period and maintain that rate substantially constant for a relatively long period of time, adjusting the fixed rate of discharge, when required, to hold the concentration of the boiler salines in the boiler below a desired maximum. Adjusting and fixing the rate of discharge from time to time is readily and adequately accomplished by increasing or decreasing the adjusted constant rate of discharge over and operating period, an eight hour shift for example, in accordance with the density of the salines themselves as discharged. A ready and adequate means of periodic adjustment of the discharge at fixed rates is provided by putting in the water discharge line a control tank open to the atmosphere which receives discharged salines with release of pressure through a valve controlled by a float in the tank, the liquid level in the tank being maintained substantially constant by a controlled outlet which under a small liquid head in the tank is adjusted to allow a constant flow of liquid salines from the tank and through the medium of the discharge valve with float control maintains a substantially constant saline discharge from the boiler irrespective of changes in the boiler pressure. For heat economy and for regularity of discharge I place in the discharge line between the boiler and the discharge line control valve a cooler which advantageously takes the form of a heat interchanger through which the feed water or part of it is passed on its way to the boiler. I may also place in the discharge line between the cooler and the saline discharge control valve a thermostatic valve adapted to cut down, or substantially stop, the saline discharge upon undue rise of temperature in the discharge line due to stopping of the feed water or other cooling medium or due to other and unforeseen emergencies. A valve with automatic control means may also be provided to start or stop the flow through the discharge line as the flow of feed water starts or stops. I may also place in the discharge line a filter for the purpose of removing from the discharge salines any boiler scale or other solid particles carried thereby.

In the described procedure as carried out by the described means, the saline content of the boiler water, which is of course higher than that of the feed water, is held within predetermined limits by adjustment of the outlet of the control tank. In other words, regulation is effected after the cooling of the salines and their release from the boiler pressure. Assuming, for example, that the concentration of salines in the boiler water has to be held at a value of 3500 milligrams of total solids in solution per liter of boiler water, and assuming that the feed water contains as an average over a period of time 100 milligrams of salines per liter, it is necessary to so adjust the discharge as to remove an aliquot and sufficient portion of the boiler water to take out the salines introduced. Thus in this example, the amount of water theoretically required to be discharged from the boiler is one thirty-fifth of the amount of the feed water. In practice this result is obtained by observing the density of the discharged salines from time to time as by means of an ordinary hydrometer and adjusting the outlet of the control tank in accordance with the actual concentration of salines as reflected in their density, increasing the fixed rate of discharge if the density increases and decreasing the rate when a decrease of density is shown. So doing, the rate of discharge may be constant over long periods of time. It may be necessary to adjust the rate not oftener than once during each operating shift.

In the accompanying drawing I have shown, more or less diagrammatically, several embodiments of my invention. In this showing:

Fig. 1 is a view partially in side elevation and partially in cross section of an assemblage of apparatus for controlling the blow-off of boiler salines;

Fig. 2 is a similar view showing an alternative arrangement for removing boiler salines from the boiler;

Fig. 3 shows a modified connection between the saline discharge line and the boiler.

As illustrated in Fig. 1, a boiler 10 is provided with a discharge line 11 extending through the top of the boiler casing downwardly to a point below the low water level in the boiler. The discharge line 11, which has a valve 12 disposed therein, runs to a cooler shown as a heat exchanging apparatus 13, wherein the heat of the discharged boiler salines may be transferred to feed water flowing around a coil 14 through which the boiler salines pass. The cooled boiler salines flow through a pipe line 15 to a control tank 17. In the discharge line may be placed a filter 42 and a thermostatically controlled valve 16, which may be so adjusted as to cut off the discharge of boiler salines when the valve temperature exceeds a pre-determined degree. The control tank 17 is open to the atmosphere. Into this tank the salines are discharged with release of the boiler pressure through a valve 19 which is controlled by a float 18, the tank being provided with an outlet pipe 20 communicating with an orfice 20a in the bottom of the tank, which is controlled by a sliding valve 21. Outlet pipe 20 has a vent 20b. Orifice 20a may be set at a given effective area by means of valve 21. With a given height of liquid in tank 17 this orifice area is readily set to give a constant rate of flow from the tank through outlet 20. This constant rate of flow is automatically maintained and reproduced in the saline discharge line by the action of float 18 in control of valve 19. Should the discharge of liquid into tank 17 be greater than the flow through orifice 20a the liquid level would rise. Float 18 is arranged to restrict the passage through valve 19 in this event, whereupon the liquid level drops. Should the flow from tank 17 be greater than the discharge into it, float 18 drops and opens valve 19 further. Thus the liquid level in tank 17 is maintained substantially constant and the rate of flow remains fixed. The outlet line 20 may be provided with a valve 22 available for shutting off the discharge of salines entirely, for, with this valve closed the liquid level in tank 17 rises high enough to cause float 18 to entirely close valve 19.

Feed water is introduced to the boiler 10 by means of a pump 24 and a pipe line 25, and, as shown, runs through the heat exchanger 13 and thence through pipe 26, provided with valve 27, to the boiler. As shown, the feed pump 24 is a steam pump supplied with steam through a steam line 28 which has a connecting line 29 running to the valve 22, the steam line 28 being provided with valve 31. In this arrangement valve 22 is a steam operated valve. In this case the opening and closing of valve 22 to start and stop the discharge of boiler salines is automatically effected as steam is turned on or off at valve 31 to start and stop the steam pump 24. It is apparent that other types of connections, based on mechanical, hydraulic or electrical principles, could be employed for this purpose. Means of such character are well known and it is unnecessary for an understanding of this invention to describe them in detail.

In operation, the discharge of boiler salines is carried on continuously and at a substantially constant rate by setting valve 21 to adjust the outlet from tank 17 at a rate sufficient to maintain the boiler saline concentration below a desired limit. It is a simple matter to determine, for any installation, the amount of salines which are introduced to the boiler in any given period of time by the feed of water, even though in most cases the feed of water to a boiler is variably continuous, being often automatically varied to maintain a desired level of water in the boiler. And it is a simple matter to adjust the amount of boiler salines withdrawn by adjustment of valve 21. This adjustment automatically maintains a constant rate of flow through the discharge line as controlled by valve 19. The vent 20b, connected to the pipe 20 at a point beyond the orifice 20a, prevents the water column in pipe 20 from exerting a suction affecting the rate of flow through orifice 20a. The boiler water is normally discharged through the tank 17 in a cool condition, which enables the operator to tell at a glance whether the boiler is blown off properly. Furthermore, he can take a sample for density testing without difficulty and should the density of the salines as discharged show a tendency to increase over an operating period it is a simple matter to adjust valve 21 accordingly.

The valve 19 is self-cleaning. If a foreign particle enters the valve the flow becomes reduced, consequently the float 18 drops, thereby opening the valve further and allowing the particle to be dislodged. The total effective head causing the boiler water to discharge through orifice 20a in the bottom of tank 17 is only the depth of water in the tank above that orifice. Consequently the orifice area is relatively large and this minimizes the danger of clogging. The head of water above the orifice is accurately maintained by float 18 controlling valve 19 and a continuous discharge at a constant rate is maintained automatically over any desired period of time. The rate of flow from the boiler through discharge line 11 is substantially constant irrespective of variation in the boiler pressure which causes the flow. The thermostatic valve 16, with or without the steam valve 22, acts as a safety device cutting off the boiler blow-off when the feed of water is stopped, and thus preventing undesirable steam flashing in tank 17 and steam hammering in the blow-off system. It substantially prevents heat loss in the blow off. The automatic control line 29 for valve 22 need not be included, provided the operator closes either one of the valves 12 or 22 at the time he stops pump 24. However, its inclusion may be advantageous since it serves as an automatic means for stopping the flow of salines when the feed of water to the boiler is stopped and for preventing lowering of the water level in the boiler below the permissible low water level.

In Fig. 2 I have shown an alternative arrangement for removing the salines from the boiler and for cooling and discharging the boiler salines independently of the feed of water to the boiler. In this arrangement blow-off 11 is provided with an equalizing pipe 32 extending from the top of the boiler to a manually operable blow-down line 33 connected into the boiler near the bottom. The pipe line 11 is disposed at a desired level and will not conduct an undue quantity of water from the boiler. The line 11 is connected to a cooler 13a through which the boiler salines pass in a coil 14a, the cooling fluid, which may be make-up water, or feed water, or other suitable liquid, being introduced and withdrawn through pipes 23 and 30, respectively. From the cooler the discharge line continues in pipe 15 running to control tank 17 which functions in a manner similar to that of control tank 17 in Fig. 1. The discharge line valve 19 here takes the form of a slide valve controlled by float 18. The outlet from tank 17 is here shown as a needle valve 21 having a screw handle 21a and a scale 21b, by means of which close adjustment of the outlet valve is facilitated. The outlet pipe 20 delivers, as shown, into an open receptacle leading to a sewer or other place of disposition of the discharged boiler salines. When desired or required for any reason, there may be inserted in pipe 15 a thermostatic valve functioning similarly to valve 16 of Fig. 1 to shut off the discharge line when the boiler salines passing through the valve reach a predetermined temperature.

When the boiler saline discharge carries undue amounts of solid matter which would interfere with the functioning of the regulating valves, a filter, such as filter 42 of Fig. 1, may be interposed in the discharge line advantageously between the cooler or heat interchanger and the control tank. As filtering medium 43, quartz, sand, slags, etc. or other suitable material may be employed. If the water is strongly alkaline, iron balls may be employed advantageously. The filter may be cleaned occasionally by backwashing according to usual practice, introducing a stream of water through a pipe line 45 to the under side of the filter, permitting it to flow in a direction opposite to the flow of the boiler salines and removing the wash water through a conduit 46. A filter of this type does not require any special means for preventing binding of the filter by steam as the discharged boiler water is normally cooled before it reaches the filter.

The filter shown in Fig. 3 is positioned ahead of the heat exchanger and accordingly it includes means for removing steam which may separate from the boiler water by reduction of pressure. The boiler salines are discharged from the bottom of the boiler reservoir and delivered to the filter through valved pipe 51, entering near the bottom and flowing upwardly through the filter bed 54 and out at 55. At the top of the filter casing, pipe 56 with a float valve is provided for the purpose of releasing separated steam. A valve drain pipe 59 is provided near the bottom.

While the foregoing description applies more particularly to a steam generating plant having but a single boiler, it is apparent that the principles of the invention are applicable to installations including a number of boilers. Many plants depend upon a single pump to supply several boilers, and the amount of water delivered to each is automatically controlled in accordance with the duty imposed upon the boiler. Constant level devices, for regulating the amount of water in each boiler, and throttling means employed for admitting the water to the boiler, render the quantities supplied to each variable over appreciable limits. In other words, the load carried by each boiler of a set differs from that carried by the others even if all the boilers are connected to the same steam line.

Each boiler, should, therefore, be provided with a separate discharge line 11 and an individual controlling device, such as the float valve tank 17 and regulator valve 21. The heat exchanger 13 may be provided with a plurality of coils 14, one for each boiler. This arrangement simplifies control and lessens the cost of the apparatus. A further simplification is possible by providing a common heat exchanger and controlling device to which each of the individual discharge lines 11 of each boiler is connected. In this event the valves 12 in the discharge lines 11 must be set to apportion the rate of discharge from each boiler to the common controlling device in accordance with the duty imposed upon each boiler.

In either case, irrespective of the number of boilers, the amount of boiler salines withdrawn may be regulated for each boiler within the operating range.

From the foregoing it will appear that a simple and economical system is provided for controlling the concentration of the saline content of the boiler within the limits of good practice in an effective manner by distributing the removal of excess salines uniformly over the entire period of operation. This is desirable, as it minimizes heat losses, avoids sudden changes in the boiler pressure and temperature, and facilitates accurate control. Obviously, the various units of the system may be selected from a large number of known types of apparatus best suited for the intended purposes.

The application is a continuation of application Serial No. 173,781, filed March 8, 1927.

What I claim is:—

1. In controlling the concentration of salines in boiler water, a simplified method of removing saline matter introduced in the feed water which consists in discharging boiler salines under pressure from the boiler substantially continuously over consecutive operating periods at constant rates fixed for said periods and calculated to remove from the boiler the salines introduced in the feed water during the respective periods, maintaining the rate for each period constant irrespective of changes in the boiler pressure, releasing the discharged boiler salines to atmospheric pressure and adjusting the rate of flow of the saline discharge at intervals, said adjustment being in accordance with observed variations in the density of the discharged salines.

2. In controlling the concentration of salines in boiler water, a simplified method of removing saline matter introduced in the feed water which consists in discharging boiler salines under pressure from the boiler substantially continuously over consecutive operating periods at constant rates fixed for said periods and calculated to remove from the boiler the salines introduced in the feed water during the respective periods, maintaining the rate for each period constant irrespective of changes in the boiler pressure, cooling the discharged salines while under pressure from the boiler, releasing the cooled salines to atmospheric pressure and adjusting the rate of flow of the cooled salines at intervals, said adjustment being in accordance with observed variations in the density of the discharged salines.

3. In controlling the concentration of boiler salines during operation of steam boilers fed with water at irregular rates and receiving varying amounts of salines in the feed water, a simplified method of removing saline matter introduced in the feed water which consists in discharging boiler salines under pressure from a boiler substantially continuously during operation of the boiler, setting the discharge at substantially constant rates over consecutive operating periods, said constant rates being irrespective of changes in the boiler pressure and independent of temporary variations in the rate of water feed, and adjusting the set rate of discharge after consecutive operating periods in direct proportion with observed variations in the concentration of the boiler salines discharged during said periods.

4. In operating a steam boiler receiving varying amounts of salines in its feed water, the process of limiting the accumulation of salines in the boiler which consists in discharging the boiler salines under pressure substantially continuously during operation of the boiler and at substantially constant rates over consecutive operating periods, said rates being independent of temporary variations in the rate of water feeding and maintained constant irrespective of boiler pressure variation, cooling the discharged boiler salines by heating the feed water therewith and regulating the discharge by adjusting the rate of flow of the cooled salines after consecutive operating periods, said adjustment being in direct proportion with observed variation in concentration of the boiler salines discharged during said periods.

5. In operating a steam boiler receiving varying amounts of salines in its feed water, the process of limiting the accumulation of salines in the boiler which consists in withdrawing boiler salines under boiler pressure substantially continuously and at substantially constant rates over consecutive operating periods, maintaining said rates constant irrespective of boiler pressure variation and of temporary variations in the rates of water feeding, cooling the withdrawn boiler salines by heating the feed water therewith, discharging the cooled salines to atmospheric pressure and controlling the withdrawal of salines by adjusting the rate of flow of the cooled boiler salines after consecutive operating periods in accordance with observed variations in concentration of the boiler salines discharged during said periods.

6. Apparatus for limiting the accumulation of dissolved salines in boiler water which comprises in combination with a steam boiler, a water discharge line therefrom, a control tank open to the atmosphere and receiving boiler salines from the discharge line, a valve in the discharge line, an adjustable outlet from the control tank and a float in the control tank connected to the discharge valve, said float being raised and lowered by changes in the level of boiler salines in the control tank.

7. Apparatus for limiting the accumulation of dissolved salines in boiler water which comprises in combination with a steam boiler a water discharge line therefrom, a control tank open to the atmosphere and receiving boiler salines from the discharge line, valve means in the discharge line, a vented adjustable outlet from the control tank, and means in the control tank operatively connected with and adapted to control the discharge valve means so as to maintain a substantially constant level of liquid in the tank.

8. Apparatus for controlling the concentration of dissolved salines in boiler water comprising in combination with a steam boiler a water discharge line running therefrom, a heat exchanger in said line adapted to cool the line by transfer of heat to water going to the boiler, a control tank receiving boiler salines from the discharge line, a valve in the discharge line, a vented adjustable outlet from the control tank and means in the control tank operatively connected with and adapted to control the discharge valve so as to maintain a substantially constant level of liquid in the tank.

9. Apparatus for controlling and maintaining a saline content in a boiler comprising a boiler, a water discharge line therefrom, a heat exchanger and a filter in said line, a constant level tank receiving water from the line and provided with a float valved inlet connected with the water discharge line, the float being responsive to the level in the constant level tank, and with an adjustable outlet, means for supplying feed water to the boiler through said heat interchanger, a valve beyond the outlet and means for closing said valve upon cessation of flow of the feed water.

10. In apparatus for establishing and maintaining a predetermined saline concentration in a boiler, a boiler, a water discharge line extending therefrom, a heat-exchanger in the line, means for supplying the boiler with feed water through the exchanger, a constant level tank receiving water from the line, said tank being provided with a float-controlled inlet from the discharge line, the float being responsive to the level in the constant level tank, and with an adjustable outlet, a valve beyond the outlet and means for opening and shutting said valve with flow and cessation of flow of feed water.

11. In apparatus for establishing and maintaining a predetermined saline concentration in a boiler, a boiler, a water discharge line extending therefrom, a heat-exchanger in the line, means for supplying the boiler with feed water through the exchanger, said means including a pump, a valve in said discharge line connected in parallel with starting means for the pump, and a tank receiving the discharged boiler water, said tank being provided with a float-controlled inlet running from the discharge line, the float being responsive to the liquid level in the tank, and with an adjustable outlet.

12. In apparatus for establishing and maintaining a predetermined saline concentration in a boiler, a boiler, a water discharge line extending therefrom, a heat-exchanger in the line, means for supplying the boiler with feed water through the exchanger, said means including a steam pump, a constant level tank receiving water from the line, said tank being provided with a float-controlled inlet running from the discharge line, the float being responsive to the level in the tank, and with an adjustable outlet, a steam operated valve beyond the outlet and a steam pipe connecting said valve and the steam inlet of said pump.

13. Means for establishing and maintaining a predetermined saline concentration in a steam boiler which comprises a boiler saline discharge line extending from the boiler, a heat exchanger in the line, means for supplying the boiler with feed water through the exchanger, means automatically closing the discharge line upon cessation of flow of feed water, a regulating valve in the discharge line beyond the heat exchanger and means associated with the flow of cooled salines for automatically adjusting the valve to maintain substantially constant rates of discharge.

14. A method of controlling the saline concentration of the water in steam boilers during operation thereof which comprises feeding saline water into the boiler, allowing the salines to accumulate to a predetermined concentration in the boiler water, discharging the salines under pressure from the boiler in a substantially continuous flow and in relative volume approximating a fraction of the boiler feed equal to the saline concentration of the feed water divided by that of the discharged salines, maintaining the rate of discharge over an extended period of time substantially constant irrespective of changes in the boiler pressure and independent of temporary variations in the rate of boiler feed and adjusting the rate of discharge at the end of said period to increase or decrease said rate for a succeeding period in direct proportion with observed increase or decrease of the saline concentration during the preceding period.

15. In maintaining a desired saline content in steam boiler water, a method of control which comprises removing from the boiler a quantity of saline matter substantially equal to that introduced in the feed water by discharging the salines under pressure continuously during operation of the boiler and at a rate approximating a fraction of the rate of feed equal to the saline concentration of the feed water divided by the saline concentration desired in the boiler, maintaining the rate of discharge constant irrespective of boiler pressure change over an extended period such as an operating shift and adjusting the rate of discharge for a succeeding period in direct proportion to observed change in the saline concentration during the preceding period.

16. A boiler blow-off control system for removing boiler salines from an operating steam boiler in quantity substantially equal to the saline matter introduced in the feed water, said system comprising in combination with a boiler, a water discharge line therefrom adapted for continuous discharge of salines under pressure during operation of the boiler, means in said discharge line for adjusting the rate of flow of the salines through said line and means associated with said adjusting means for maintaining said adjusted rate of flow constant irrespective of boiler pressure variation.

17. A boiler blow-off control system for removing boiler salines from an operating steam boiler in quantity substantially equal to the saline matter introduced in the feed water, said system comprising in combination with a boiler, a water discharge line therefrom adapted for continuous discharge of salines under pressure during operation of the boiler, a heat exchanger in said line adapted to cool the discharged salines by transfer of heat to the feed water, means in said discharge line beyond the heat exchanger for adjusting the rate of flow of the cooled salines through said line and means associated with said adjusting means for maintaining said adjusted rate of flow constant irrespective of boiler pressure variation.

18. A boiler blow-off control system for removing boiler salines from an operating steam boiler in quantity substantially equal to the saline matter introduced in the feed water, said system comprising in combination with a boiler, a water discharge line therefrom adapted for continuous discharge of salines under pressure during operation of the boiler, a cooler in said line, means in said discharge line beyond the cooler for adjusting the rate of flow of the cooled salines through said line and means associated with said adjusting means for maintaining said adjusted rate of flow constant irrespective of boiler pressure variation, said two associated means being adapted to release the salines to atmospheric pressure.

In testimony whereof, I have hereunto affixed my signature.

HEINRICH KRIEGSHEIM.